United States Patent
Forst et al.

(10) Patent No.: US 7,954,302 B2
(45) Date of Patent: Jun. 7, 2011

(54) SEALING APPARATUS WITH SEALING LOAD CONTROL

(75) Inventors: Lutz Forst, Laupheim (DE); Andreas Armbruster, Bad Saulgau (DE); Tobias Bieger, Altheim (DE)

(73) Assignee: Uhlmann Pac-Systeme GmbH + Co.KG, Laupheim (DE)

( * ) Notice: Subject to any disclaimer, the term of this patent is extended or adjusted under 35 U.S.C. 154(b) by 156 days.

(21) Appl. No.: 12/354,097

(22) Filed: Jan. 15, 2009

(65) Prior Publication Data

US 2010/0018155 A1    Jan. 28, 2010

(30) Foreign Application Priority Data

Jan. 19, 2008    (EP) .................................... 08001002

(51) Int. Cl.
*B65B 57/00* (2006.01)
(52) U.S. Cl. .............................. 53/75; 53/376.2; 53/559
(58) Field of Classification Search .................... 53/285, 53/367, 376.2, 378.3, 559, 75
See application file for complete search history.

(56) References Cited

U.S. PATENT DOCUMENTS

| | | | | |
|---|---|---|---|---|
| 3,759,011 | A * | 9/1973 | Akke | 53/559 |
| 4,750,318 | A * | 6/1988 | Matsuzawa | 53/559 |
| 5,366,685 | A * | 11/1994 | Fujii et al. | 264/547 |
| 5,655,357 | A * | 8/1997 | Kristen | 53/512 |
| 7,448,183 | B2 * | 11/2008 | Gertitschke et al. | 53/329.4 |
| 2006/0096254 | A1 * | 5/2006 | Rogers | 53/469 |
| 2006/0283154 | A1 * | 12/2006 | Matzenmuller | 53/556 |
| 2008/0016824 | A1 * | 1/2008 | Rodi | 53/389.4 |

FOREIGN PATENT DOCUMENTS

| | | |
|---|---|---|
| DE | 19740191 | 5/1998 |
| DE | 10052218 | 5/2002 |
| DE | 102004062520 | 7/2006 |
| DE | 102005030211 | 1/2007 |

OTHER PUBLICATIONS

Machine Translation for document DE 197 40 191 A1. Obtained from EPO website.*
Machine Translation for document DE 100 52 218 A1. Obtained from EPO website.*
Machine Translation for document DE 10 2004 062 520 A1. Obtained from EPO website.*
Machine Translation for document DE 10 2005 030 211 A1. Obtained from EPO website.*

* cited by examiner

*Primary Examiner* — Paul R Durand
(74) *Attorney, Agent, or Firm* — Andrew Wilford (57) ABSTRACT

An apparatus for sealing a cover film to a blister film having blisters holding respective small objects has a feed roll rotatable about an axis and formed with an array of radially outwardly open recesses arrayed like the blisters of the blister film. The blister film passes over the feed roll with the blisters in the recesses. A sealing roll is rotatable about an axis generally parallel to the feed-roll axis and presses the cover foil down against the blister foil on the feed roll. The feed roll is rotated to pull the films in a travel direction between the rolls so that the cover film is sealed to the blister film between the blisters thereof. A sensor detects movement of the sealing roll transversely of the feed-roll axis. A controller generates an output when the detected movement exceeds a threshold.

13 Claims, 6 Drawing Sheets

SEALING APPARATUS WITH SEALING LOAD CONTROL

FIELD OF THE INVENTION

The present invention relates to a sealing apparatus. More particularly this invention concerns such an apparatus used to make blister packs.

BACKGROUND OF THE INVENTION

Small objects such as pills or capsules are typically marketed in blister packs comprising a base film formed with an array of blisters or pockets each holding one or more of the objects and a cover film sealed to a face of the blister film in the webs between the pockets. Such a package is made normally in a continuous manner by advancing the blister film with its pockets open upward first through a filling station where the objects are loaded into the pockets and then through a sealing station where the cover film is applied to the upper face of the blister film and sealed to it, typically by heat.

In the sealing station the blister film is advanced in a travel direction by a constantly rotating drive roll having a cylindrical surface formed with an array of recesses into which the pockets fit, so the drive roll pulls the blister film through the sealing station. A heated sealing roll with a smooth cylindrical surface and centered on an axis presses the cover film downward against the drive roll and seals the two films together. The two films leave the sealing station laminated together and hermetically containing the objects. Such machines are described in German patent documents 197 40 191, 100 52 218, and 10 2004 062 520.

A problem with such systems is that the products to be sealed, such as, for example, tablets, capsules, coated pills, or the like that are to be filled into the blisters and that are to be enclosed by the cover and blister film, are not in the blisters but instead are located adjacent thereto on the cover film on the webs between the blisters. This can be caused, first of all, by misfeeds that leave the products to be sealed resting next to the blisters. Second, during transport of the cover film the products can move out of the blisters due to vibration or movements of the cover film. The objects can also move out of the blisters due to static loads or human intervention.

Typically, these incorrectly placed products can be detected by angled brushes or by safety flaps and removed. Nevertheless, a situation can occur in which products are still on the webs between the blisters even after passing these quality-control devices. In this case the two films enter the gap between the sealing roll and feed roll not in surface contact at the webs, but held at a spacing by an object that is out of place. As the thus spread films pass through the sealer, the tablet is partially crushed, thereby contaminating the package being produced. If not culled out, such a package can get to the consumer spoiled and, in the case of a medicament, create a potentially dangerous situation.

Furthermore an object not in a blister and wedged between the films pushes the sealing roll away from the feed roll, so that an entire row of packages is not sealed and must be rejected. This requires a meticulous downstream inspection to locate and cull such defective packages.

OBJECTS OF THE INVENTION

It is therefore an object of the present invention to provide an improved sealing apparatus of the above-described general type.

Another object is to provide a sealing apparatus that ensures that the blister packs are problem-free and free of contamination during subsequent processing after the sealing step.

SUMMARY OF THE INVENTION

An apparatus for sealing a cover film to a blister film having blisters holding respective small objects has according to the invention a feed roll rotatable about an axis and formed with an array of radially outwardly open recesses arrayed like the blisters of the blister film. The blister film passes over the feed roll with the blisters in the recesses. A sealing roll is rotatable about an axis generally parallel to the feed-roll axis and presses the cover foil down against the blister foil on the feed roll. The feed roll is rotated to pull the films in a travel direction between the rolls so that the cover film is sealed to the blister film between the blisters thereof. A sensor detects movement of the sealing roll transversely of the feed-roll axis, and a controller generates an output when the movement detected by sensor means exceeds a predetermined threshold.

Another advantage of the invention system consists in the fact that any damage to the sealing roll and/or to the feed roll, as well as unbalances can be detected.

An additional advantage is that any unsealed or defectively sealed blisters can be detected. Furthermore, products can also be detected that have been crushed in the gap between sealing roll and feed roll.

Another advantage is that any shaped films can be detected that are passing into the feed roll due to faulty steps in the feed.

As a result, a warning can readily be given when these malfunctions or disruptions are detected, and then actions can be taken to remove the defective blister pack whereby, for example, the sensors supply appropriate warning signals or control signals to a control means of the blister machine.

In a first aspect of this invention, the sensor for the sealing apparatus is associated with a roll holder, such as, e.g. a movable arm, the roll holder being supported on a bearing such that the sealing roll is pivotal by means of the roll holder in an arcuate motion onto the feed roll. This has the advantage that, first, the sealing roll is pressed against the feed roll in a precisely controllable manner, and secondly, any possible interference with the sealing operation can be prevented due to the positioning of the sensor on the roll holder.

The sensor preferably has a laser to optically determine the deflection of the roll holder. As a result, sealing of the cover film to the blister film can be monitored for irregularities by a contact-free approach without affecting the sealing roll.

Alternatively or additionally, the sensor has a measuring detector, in particular, a mechanical measuring sensor, to determine the deflection of the roll holder. As a result, any deflection of the roll holder due to deflection of the sealing roll is detected in an extremely reliable and cost-effective manner, and sealing of the cover film to the blister film is monitored for irregularities.

In an advantageous system the sensor has at least one, in particular, two strain gauges to determine the change in position of the roll holder, these strain gauges being mounted, in particular, at the center of the roll holder. As a result, any deflection of the roll holder is easily detected.

In addition, the sensor can have an angle encoder disposed on the bearing of the roll holder to measure the angle of deflection of the roll holder. In this way, the sensor is integrated in an especially suitable manner in the sealing apparatus, and determination of the deflection is possible with a high level of precision.

In this design of the sealing apparatus, the bearing is at the center of the roll holder. This provides the advantage that the required sealing force can be applied more easily.

In this design of the sealing apparatus, it has proven advantageous for the sensor to include a dynamometer to determine a change in the sealing force, the dynamometer being disposed in a region where force is applied to the roll holder, in particular, at the end of the roll holder opposite the sealing roll, thereby achieving a higher measurement sensitivity to position changes in the sealing roll.

In the case of another sealing apparatus, it has proven advantageous to mount the bearing at the end of the roll holder opposite the sealing roll, since this results in the advantage that a more compact construction is possible.

In a second aspect of this invention, a guide and a sealing roll bracket accommodating the sealing roll are provide on the sealing apparatus such that the sealing roll bracket is movable along the guide, the sensor being associated with the sealing roll bracket. The linear guide of the sealing roll bracket allows for both a simpler control of the requisite sealing force as well as a simpler determination of the deflection of the sealing roll.

In addition, in this sealing apparatus the sensor can have a laser to optically determine the position change in the sealing roll bracket. Alternatively and/or additionally, the sensor can have a mechanical measuring sensor to mechanically determine the positional change of the sealing roll bracket. The sensor can furthermore include a dynamometer that is disposed in a region where force is applied to the sealing roll bracket. These designs each produce the advantages already mentioned in regard to the first aspect of the invention, where in addition the deflection of the sealing roll is able to be determined more simply due to the linear guide of the sealing roll bracket.

In a third aspect of this invention, the sealing apparatus has a bearing for the sealing roll, a strain gauge being provided on the bearing for the purpose of determining a position change of the sealing roll and/or a dynamometer is provided on the bearing for the purpose of determining a change in the sealing force. This has the advantage that the deflection of the sealing roll can be determined directly, and thus with higher precision.

In a fourth aspect of this invention, the sealing roll for the sealing apparatus is mounted in a pivot bearing parallel to the direction of motion of the cover film, in particular, at the center. As a result, the sealing roll contacts the feed roll more precisely, with the result that a continuous linear contact between sealing roll and feed roll can be ensured to provide better sealing quality.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
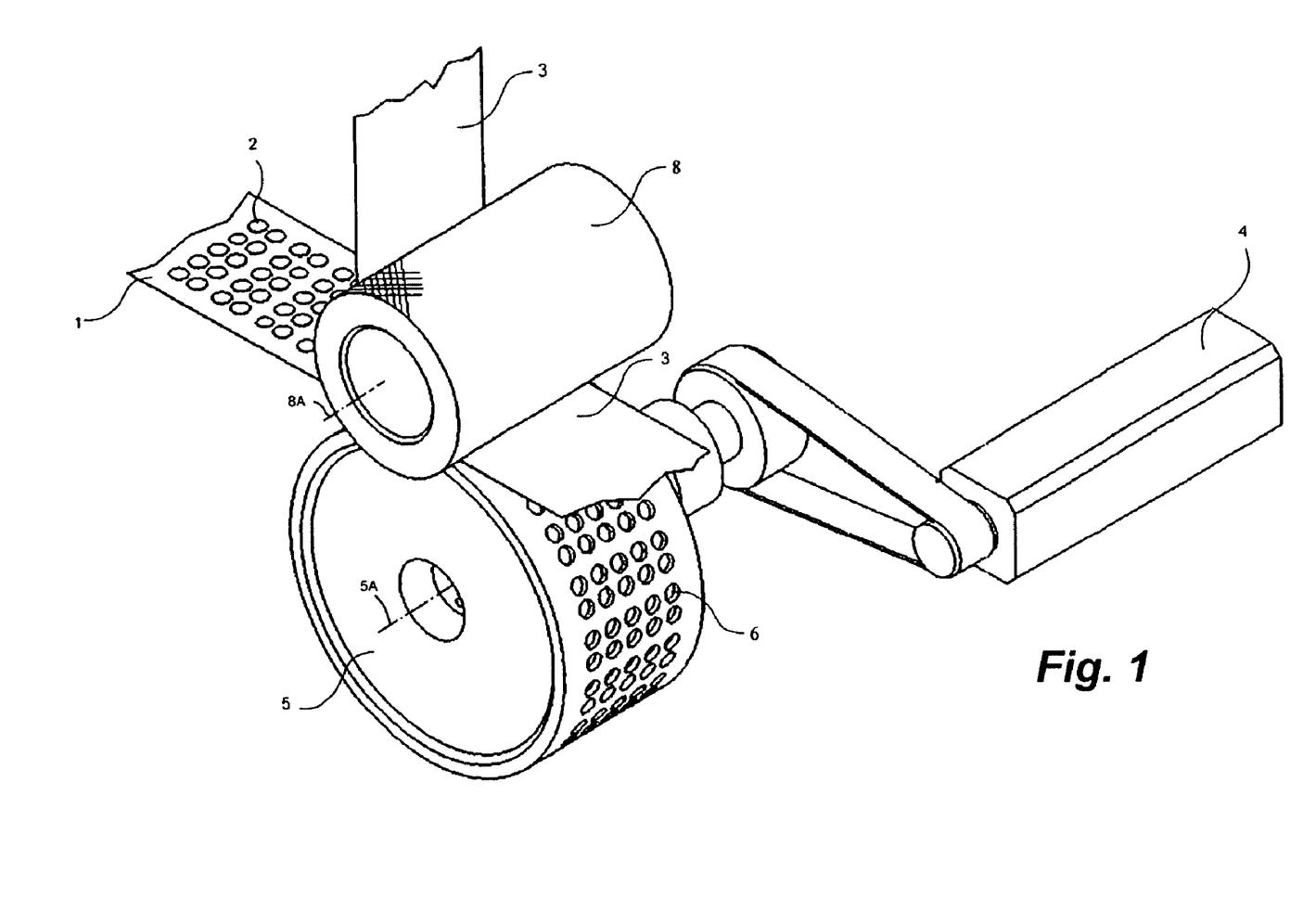
FIG. 1 is a schematic perspective view of a sealing apparatus.

As seen in FIG. 1 a sealing apparatus seals a cover film 1 to a blister film 3 having filled blisters 2. The sealing apparatus has a feed roll 5 whose outer surface is formed with recesses or pockets 6 arrayed identically to the blisters 2 of the blister film 2, a sealing roll 8 with a cylindrical outer surface, and a drive 4 that rotates the feed roll 5 about its axis 5A while rotatably entraining the sealing roll 8 about its axis 8A. The cover film 1 and blister film 3 are passed between the feed roll 5 and the sealing roll 8 in order to seal products 9 (FIGS. 2 and 3) in the pockets 2 between the cover film 1 and the blister film 3 by means of pressure and heat.

Figure 5:
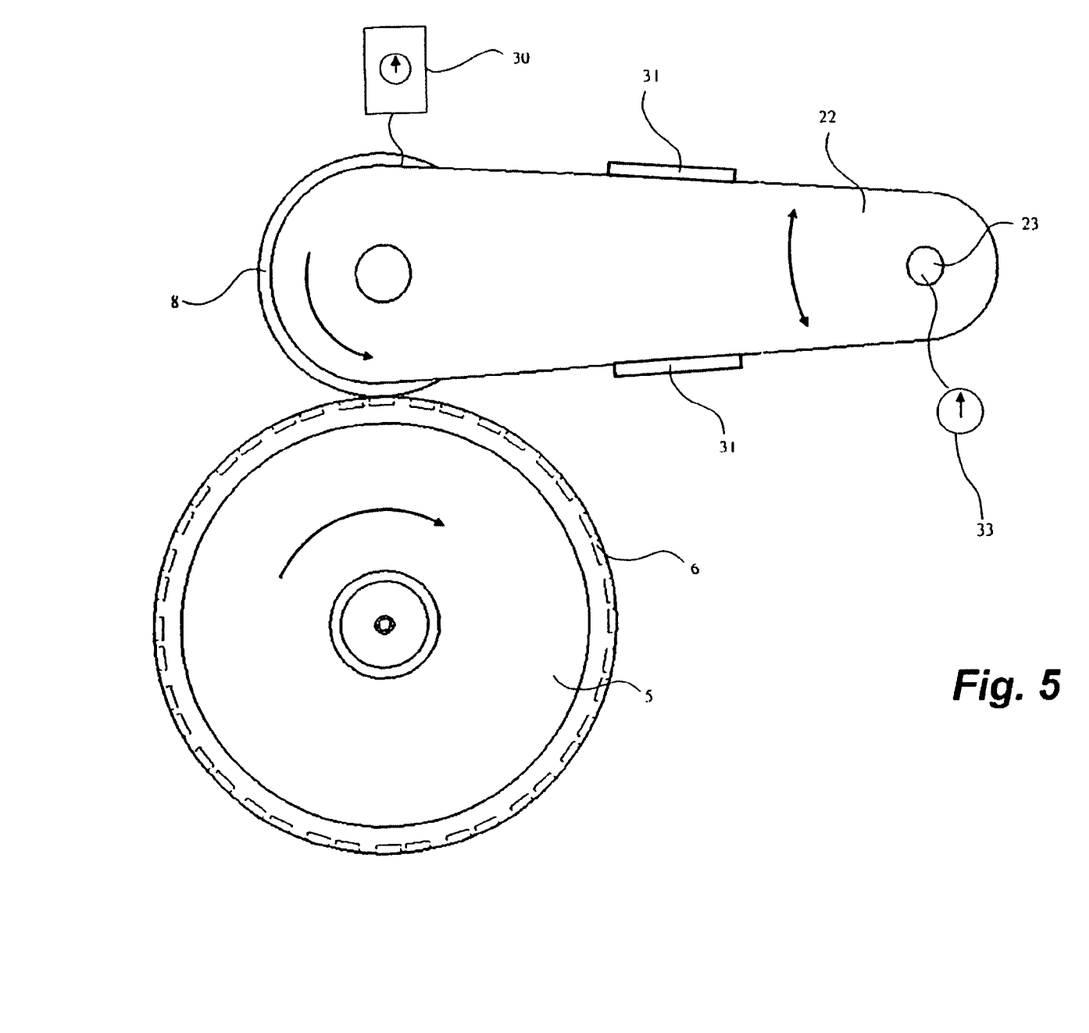
FIG. 5 is a schematic side view of a second embodiment of the sealing apparatus according to this invention.
Figure 6:
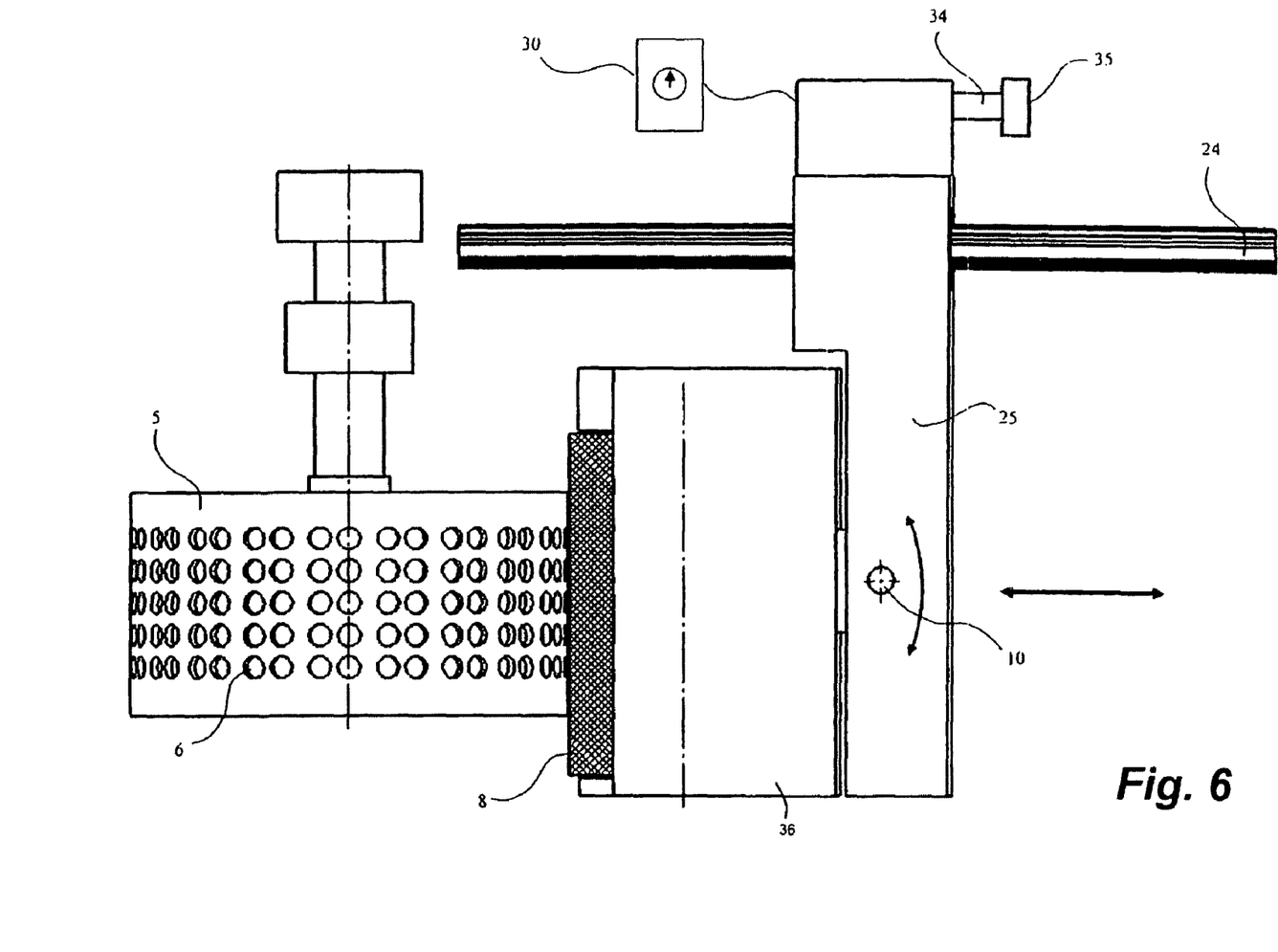
FIG. 6 is a schematic end view of a third embodiment of the sealing apparatus according to this invention.

The sealing roll 8 can move relative to the roll 5 arcuately about an axis defined by a shaft 21 (FIG. 4) or 23 (FIG. 5) extending parallel to the axes 5A and 8A or in a straight line relative to a guide 24 (FIG. 6). In addition the sealing roll 8 can rock about an axis defined by a pivot 10 and extending generally perpendicular to the axis 5A generally centrally of the roll 8.

Due to various effects, a situation may arise whereby the products 9 to be sealed are not located as intended in the blisters 2 but instead on the film 1 between the blisters 2. This can result in the problems illustrated in FIGS. 2 and 3 during subsequent processing.

Figure 2:
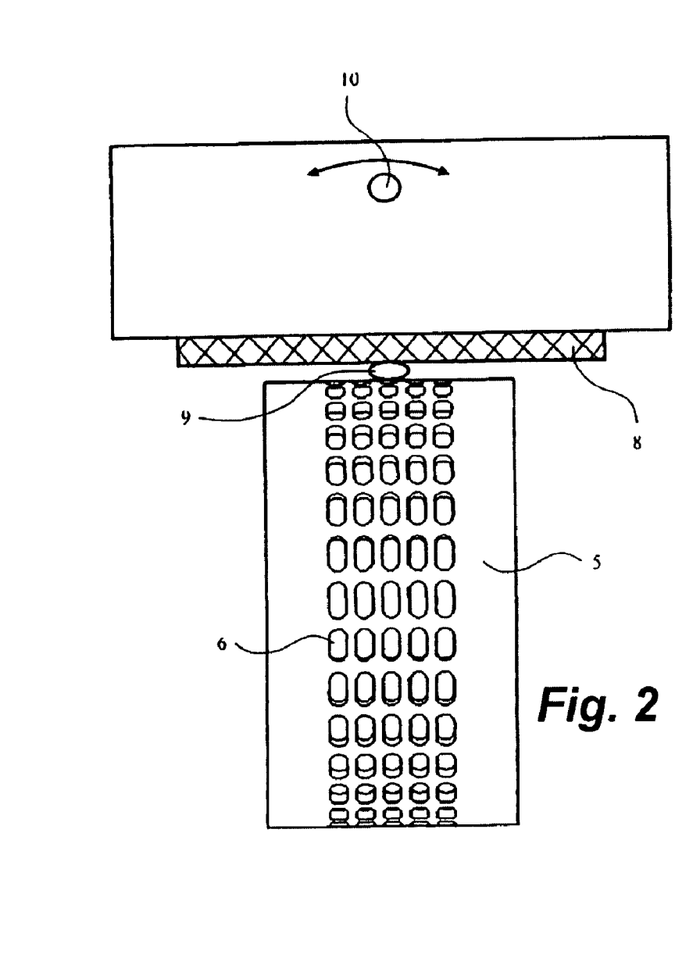
FIGS. 2 and 3 are end views showing how the sealing roll can be shifted by a misplaced object.

FIG. 2 shows a deflection of the sealing roll 8 resulting from a tablet 9 that was incorrectly placed at the center on the film 1. The tablet 9 is here in the gap between the feed roll 5 and the sealing roll 8. Since here the incorrectly placed tablet 9 is located exactly below the pivot 10, the sealing roll 8 is lifted up to an extent equal to the thickness of the tablet 9, thereby preventing the sealing of other tablets 9 in blisters 2 in line therewith from taking place. These disruptions in the process need to be detected in order to be able to easily and quickly separate out the defective blister in a subsequent step.

Figure 3:
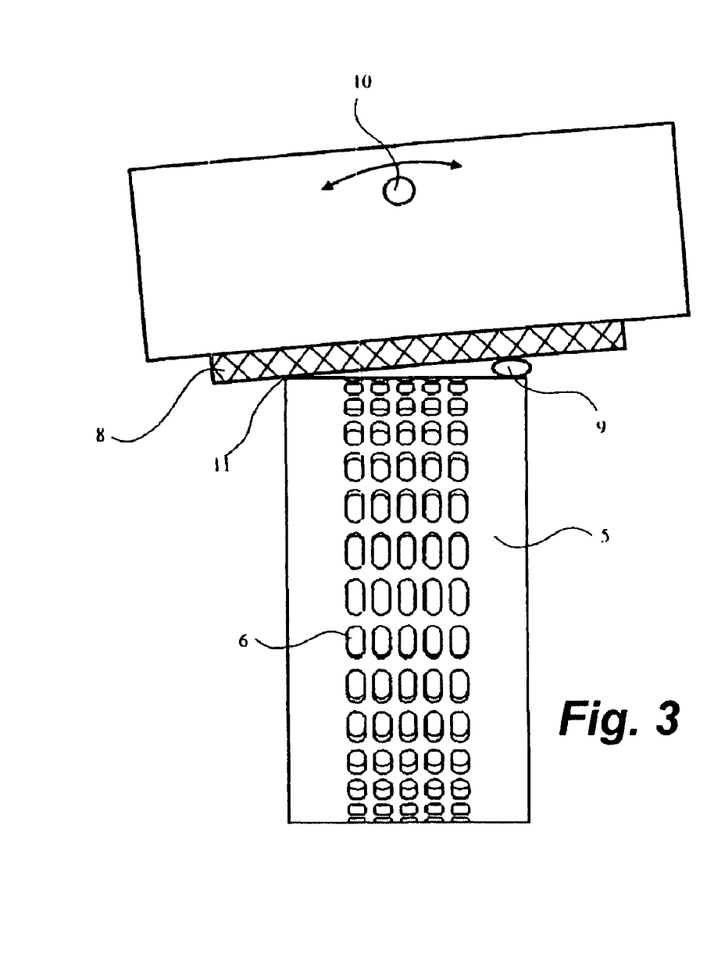

FIG. 3 shows a deflection of the sealing roll 8 by a tablet that has been incorrectly placed at the edge of the film 1. Since the incorrectly placed tablet 9 is not located below the pivot 10 but instead at the edge of the film 1, the sealing roll 8 is tilted about the pivot 10 such that it only contacts the tablet 9 and an edge 11 of the lower feed roll 5. As a result, the sealing roll 8 rocks on the pivot 10 and the other tablets in line with the tablet 9 outside its blister 9 are not sealed in their blisters 2.

These position changes of the sealing roll 8 indicated in FIG. 2 and FIG. 3 need to be detected for the defective blisters to be removed. In order to detect these position changes, this invention provides sensors 30, 31, 33, and 35 that determine the position changes illustrated in FIGS. 2 and 3. These sensors 30, 31, 33, and 35 are connected to a controller 37 itself connected to an alarm 38 or the like. What must be taken into account here is that only those position changes for sealing roll 8 need to be detected that are created by movements that indicate a defective product is being produced, not the minor vibrations and movements that occur naturally in such a process that operates at a relatively high speed. These minor deflections must be ignored to prevent false alarms, with the result that the specific range must be evaluated in order to be able to detect only significant irregularities. Thus the controller 37 only generates an output when one of the sensors 30, 31, 33, or 35 detects a movement or pressure that exceeds a predetermined threshold or minimum value.

Figure 4:
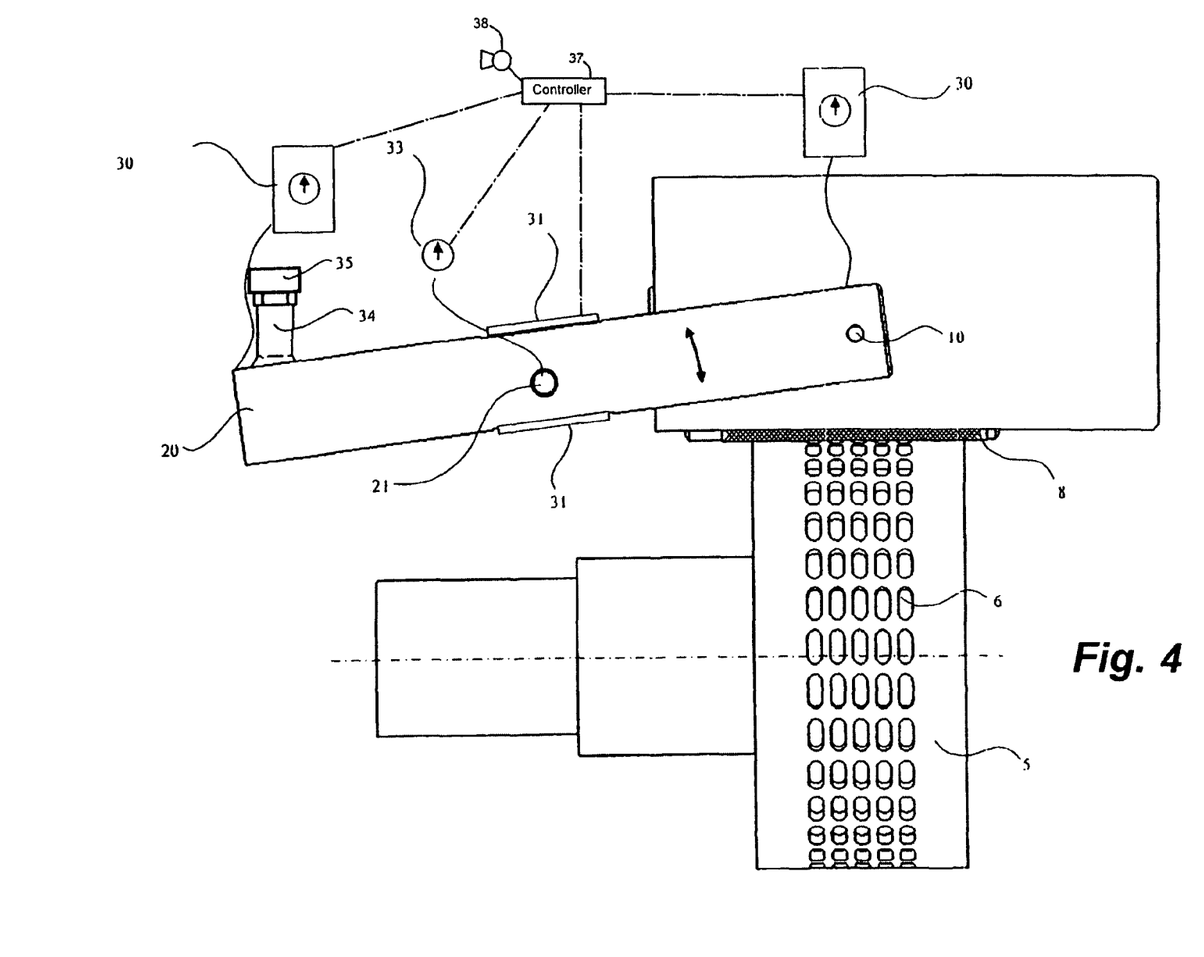
FIG. 4 is a schematic end view of a first embodiment of the sealing apparatus according to this invention.

FIG. 4 shows a first embodiment of the sealing apparatus according to this invention. The sealing roll 8 is pivotal at an outer end of a holder 20 and can rock on this outer end about the pivot 10. The roll holder 20 is centrally supported at a pivot 21 parallel to the pivot 10. Various possibilities for the measuring points and the sensors are illustrated in FIG. 4, these sensors being used either singly or in any desired combination.

More particularly, an angle-position sensor 33, in particular, an angle encoder is installed on the pivot 21 of roll holder 20 so as to detect a change in the angular position of the holder 20 carrying the sealing roll 8. Furthermore, a laser-type displacement-measuring sensor 30, in particular, a mechanical or electrical displacement measuring system can preferably be installed on one of the two ends of the roll holder 20 or on both ends of the roll holder 20 to detect a change in the position of sealing roll 8 by means of a position change in the ends of the roll holder 20. In addition, a dynamometer or accelerometer 35 can be provided at one region 34 of the application of force on the roll holder 20 in order to detect a position change of the sealing roll 8 by means of a change in application of force used to establish and maintain the sealing force, whereby, in particular, any lifting of the sealing roll 8 from the feed roll 5 caused by pulse-like shocks can be detected. In addition, a strain-gauge sensor 31 can be installed on the pivot 21 of the roll holder 20, as shown in FIG. 4, in order to detect a position change of the sealing roll 8 caused by strain.

FIG. 5 shows the sealing apparatus according to this invention. Here the sealing roll 8 is journaled in the outer end of a roll holder 22 pivotal relative to the feed roll 5 about its inner end on the pivot 23. Here an angle-position sensor 23, in particular, an angle encoder, can be installed on the pivot 23 of the roll holder 22 in order to detect a position change in the sealing roll 8 by means of an angular movement of the roll holder 22 carrying the sealing roll 8. In addition, a laser-type distance-measuring sensor 30 can be installed preferably on the outer end of the roll holder 22 carrying the roll 8 in order to detect a position change of this roll 8 by means of a position change in the outer end of the roll holder 22. Strain-gauge sensors 31 can be installed on the roll holder 22 at the center to detect a position change of the sealing roll 8 by means of strain.

FIG. 6 shows how the sealing roll 8 can be shifted in a straight line along a guide 25 toward the feed roll 5, to which end the roll 8 is journaled in a housing 36 pivoted at 10 on the outer end of an arm or bracket 25 slidable along this guide 24. Here a laser-type displacement-measuring system 30, in particular, a mechanical or an electrical displacement measuring system can be installed on the sealing-roll bracket 25 in order to detect a position change of the sealing roll 8. In addition, a dynamometer 35 can be disposed at a region where biasing force is applied to the sealing-roll bracket 25 so as to detect a position change of the sealing roll 8 by means of a change in the application of force used to establish and maintain the sealing pressure, whereby any lifting of the sealing roll 8 from the feed roll 5 caused, in particular, by pulse-like shocks can be detected.

Figure 7:
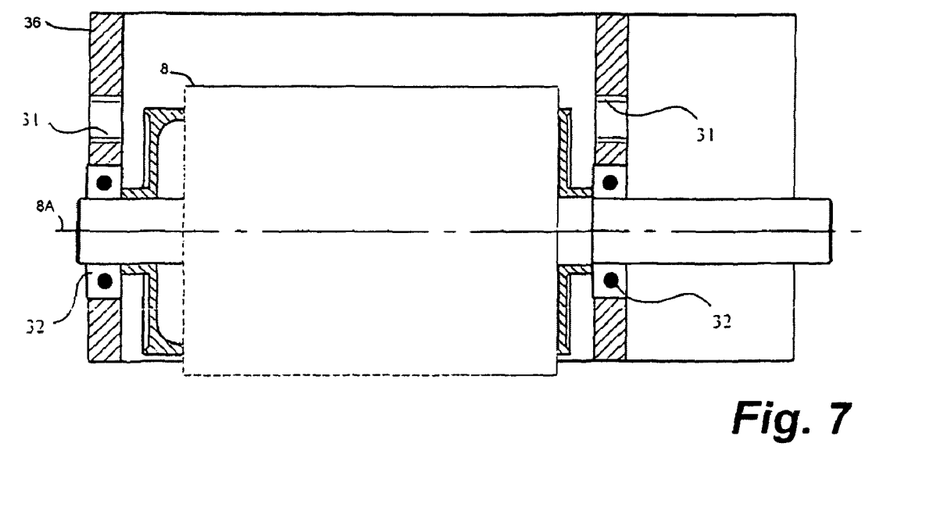
FIG. 7 is a cross-section through a fourth embodiment of the sealing apparatus according to this invention.
Figure 8:
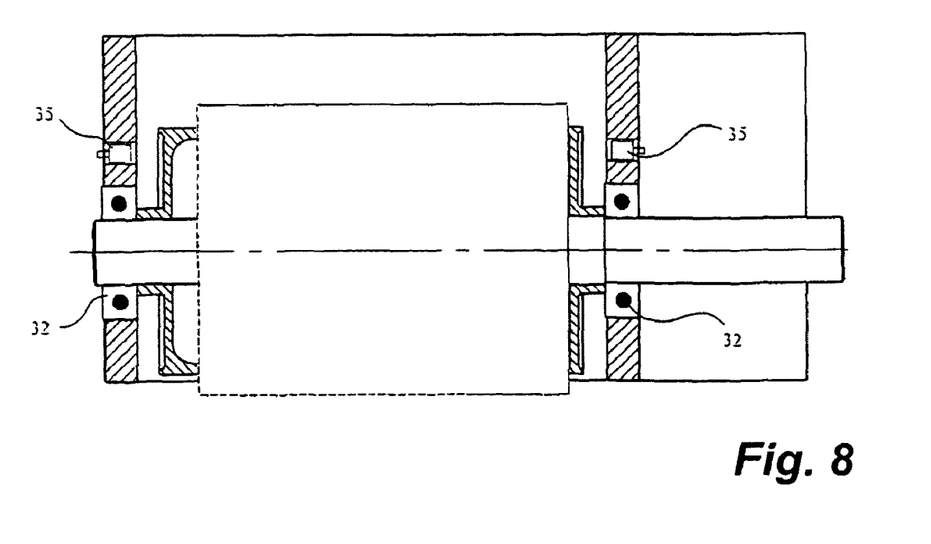
FIG. 8 is a cross-section through a fifth embodiment of the sealing apparatus according to this invention.

In FIGS. 7 and 8 a sealing roll 8 in a housing 36 carried on a pivot 10 (not shown) is carried on a pair of bearings 32 defining the axis 8A. Here the sensor 35 is a pressure-sensitive and is mounted in a region for example, a pneumatic cylinder, where biasing force is applied to the roller 8. In the fourth embodiment of the sealing apparatus of FIG. 7, respective pressure-sensitive strain gauges 31 are mounted on the bearings 31 in order to detect a position change of sealing roll 8 by means of a strain of strain gauge 31.

In the fifth embodiment of the sealing apparatus 8 shown in FIG. 8, two dynamometers 35 are each disposed adjacent a respective one of the two bearing elements 32 in order to detect a position change of the sealing roll 8 by means a change in the force acting on bearing elements 32.

The fourth and fifth embodiments of the sealing apparatus can be combined. It is also possible to combine the first, second, or the third embodiment with the fourth and fifth embodiments.

We claim:

1. An apparatus for sealing a cover film to a blister film having blisters holding respective small objects, the apparatus comprising:
   a feed roll rotatable about an axis and formed with an array of radially outwardly open recesses arrayed like the blisters of the blister film, the blister film passing over the feed roll with the blisters in the recesses;
   a sealing roll rotatable about an axis generally parallel to the feed-roll axis and pressing the cover foil down against the blister foil on the feed roll;
   a roll holder shiftable toward and away from the feed roll, the sealing roll being journaled for rotation about the sealing-roll axis in the roll holder;
   means for rotating the feed roll and thereby pulling the films in a travel direction between the rolls, whereby the cover film is sealed to the blister film between the blisters thereof;
   at least one strain gauge engaging the roll holder for detecting movement of the sealing roll transversely of the feed-roll axis; and
   control means for generating an output when the movement detected by the strain gauge exceeds a predetermined threshold.

2. The sealing apparatus defined in claim 1, further comprising
   biasing means for urging the roll holder toward the feed roll.

3. The sealing apparatus defined in claim 2 wherein the control means includes sensor means for measuring movement of the holder.

4. The sealing apparatus defined in claim 2 wherein the roll holder is pivotal about an axis, the apparatus further comprising
   sensor means at the axis for measuring angular movement of the holder.

5. The sealing apparatus defined in claim 2 wherein the roll holder has an outer end carrying the sealing roll, an inner end engaging the biasing means, and a central pivot.

6. The sealing apparatus defined in claim 5, further comprising
   sensor means at the central pivot for measuring angular movement of the holder.

7. The sealing apparatus defined in claim 2, further comprising
   a straight guide extending away from the feed roll, the holder being slidable in a straight line along the guide toward and away from the feed roll.

8. An apparatus for sealing a cover film to a blister film having blisters holding respective small objects, the apparatus comprising:
   a feed roll rotatable about an axis and formed with an array of radially outwardly open recesses arrayed like the blisters of the blister film, the blister film passing over the feed roll with the blisters in the recesses;
   a sealing roll rotatable about an axis generally parallel to the feed-roll axis and pressing the cover foil down against the blister foil on the feed roll;

means for rotating the feed roll and thereby pulling the films in a travel direction between the rolls, whereby the cover film is sealed to the blister film between the blisters thereof;

a roll holder shiftable toward and away from the feed roll and having an outer end carrying the sealing roll, an inner end engaging the biasing means, and a central pivot, the sealing roll being journaled for rotation about the sealing-roll axis in the roll holder; and biasing means for urging the roll holder toward the feed roll;

sensor means provided at the inner end for detecting pressure and movement of the sealing roll transversely of the feed-roll axis; and control means for generating an output when the movement detected by sensor means exceeds a predetermined threshold.

9. An apparatus for sealing a cover film to a blister film having blisters holding respective small objects, the apparatus comprising:

a feed roll rotatable about an axis and formed with an array of radially outwardly open recesses arrayed like the blisters of the blister film, the blister film passing over the feed roll with the blisters in the recesses;

a sealing roll rotatable about an axis generally parallel to the feed-roll axis and pressing the cover foil down against the blister foil on the feed roll;

means for rotating the feed roll and thereby pulling the films in a travel direction between the rolls, whereby the cover film is sealed to the blister film between the blisters thereof;

a roll holder shiftable toward and away from the feed roll, the sealing roll being journaled for rotation about the sealing-roll axis in the roll holder;

biasing means for urging the roll holder toward the feed roll;

a straight guide extending away from the feed roll, the holder being slidable in a straight line along the guide toward and away from the feed roll;

sensor means for detecting movement of the holder along the guide; and control means for generating an output when the movement detected by sensor means exceeds a predetermined threshold.

10. An apparatus for sealing a cover film to a blister film having blisters holding respective small objects, the apparatus comprising:

a feed roll rotatable about an axis and formed with an array of radially outwardly open recesses arrayed like the blisters of the blister film, the blister film passing over the feed roll with the blisters in the recesses;

a sealing roll rotatable about an axis generally parallel to the feed-roll axis and pressing the cover foil down against the blister foil on the feed roll;

means for rotating the feed roll and thereby pulling the films in a travel direction between the rolls, whereby the cover film is sealed to the blister film between the blisters thereof;

a pressure detector between the biasing means and the holder for detecting movement of the sealing roll transversely of the feed-roll axis;

control means for generating an output when the movement detected by sensor means exceeds a predetermined threshold;

a roll holder shiftable toward and away from the feed roll, the sealing roll being journaled for rotation about the sealing-roll axis in the roll holder;

biasing means for urging the roll holder toward the feed roll; and a straight guide extending away from the feed roll, the holder being slidable in a straight line along the guide toward and away from the feed roll.

11. An apparatus for sealing a cover film to a blister film having blisters holding respective small objects, the apparatus comprising:

a feed roll rotatable about an axis and formed with an array of radially outwardly open recesses arrayed like the blisters of the blister film, the blister film passing over the feed roll with the blisters in the recesses;

a sealing roll rotatable about an axis generally parallel to the feed-roll axis and pressing the cover foil down against the blister foil on the feed roll;

means for rotating the feed roll and thereby pulling the films in a travel direction between the rolls, whereby the cover film is sealed to the blister film between the blisters thereof;

sensor means for detecting movement of the sealing roll transversely of the feed-roll axis;

control means for generating an output when the movement detected by the sensor means exceeds a predetermined threshold;

a roll holder shiftable toward and away from the feed roll, the sealing roll being journaled for rotation about the sealing-roll axis in the roll holder;

biasing means for urging the roll holder toward the feed roll; and a housing pivotal on the holder about a housing axis transverse to the sealing-roll axis, the sealing roll being rotatable in the housing about the sealing-roll axis and being rockable with the housing about the housing axis, the sensor means including a housing-axis sensor for detecting rocking of the housing relative to the holder about the housing axis.

12. The sealing apparatus defined in claim 11 wherein the housing-axis sensor detects angular movement of the housing on the holder.

13. The sealing apparatus defined in claim 11 wherein the housing-axis sensor detects pressure exerted on pivoting of the housing relative to the holder.

* * * * *